United States Patent
Bosch

(10) Patent No.: US 8,918,519 B1
(45) Date of Patent: Dec. 23, 2014

(54) DELAYED NETWORK INTERFACE SELECTION

(75) Inventor: Hendrikus G. P. Bosch, Aalsmeer (NL)

(73) Assignee: Juniper Networks, Inc., Sunnyvale, CA (US)

( * ) Notice: Subject to any disclaimer, the term of this patent is extended or adjusted under 35 U.S.C. 154(b) by 181 days.

(21) Appl. No.: 13/194,145

(22) Filed: Jul. 29, 2011

(51) Int. Cl.
*G06F 15/16* (2006.01)

(52) U.S. Cl.
USPC ............ 709/227; 705/44; 455/450; 455/458; 455/466; 455/509; 455/515

(58) Field of Classification Search
CPC ......... H04W 4/12; H04W 4/14; H04W 80/04; H04W 48/18; H04W 76/028; G06Q 20/32; G06Q 30/0258; G06Q 30/0267; H04L 12/58; H04L 51/14; H04L 12/5855; H04L 51/38; H04L 65/1073; H04L 65/40; H04L 67/104; H04L 67/141

See application file for complete search history.

(56) References Cited

U.S. PATENT DOCUMENTS

| | | | |
|---|---|---|---|
| 2004/0009774 A1* | 1/2004 | Kotzin et al. | 455/450 |
| 2004/0224709 A1* | 11/2004 | Yi et al. | 455/515 |
| 2004/0252696 A1* | 12/2004 | Kakishima et al. | 370/395.2 |
| 2005/0085250 A1* | 4/2005 | Lee et al. | 455/509 |
| 2005/0220134 A1* | 10/2005 | Lin | 370/437 |
| 2006/0128405 A1* | 6/2006 | Klassen et al. | 455/466 |
| 2006/0294245 A1* | 12/2006 | Raguparan et al. | 709/227 |
| 2008/0059627 A1* | 3/2008 | Hamalainen et al. | 709/224 |
| 2008/0200188 A1* | 8/2008 | Rajahalme et al. | 455/458 |
| 2010/0154050 A1* | 6/2010 | Mukkara et al. | 726/15 |
| 2011/0093390 A1* | 4/2011 | Tischer et al. | 705/44 |
| 2011/0219089 A1* | 9/2011 | Robertson et al. | 709/206 |

* cited by examiner

*Primary Examiner* — Dustin Nguyen
*Assistant Examiner* — Hao Nguyen
(74) *Attorney, Agent, or Firm* — Harrity & Harrity, LLP

(57) ABSTRACT

A user device may communicate registration information to a paging service system and receive a page message from the paging service system via out-of-band signaling. The page message may include a request to establish a communication session with a device, and out-of-band signaling may include a communication channel not dedicated for call session transmissions. The user device may select an in-band channel based on the page message, where the in-band channel comprises a communication channel dedicated for call session transmissions, and establish a communication session with the device using the in-band channel.

20 Claims, 10 Drawing Sheets

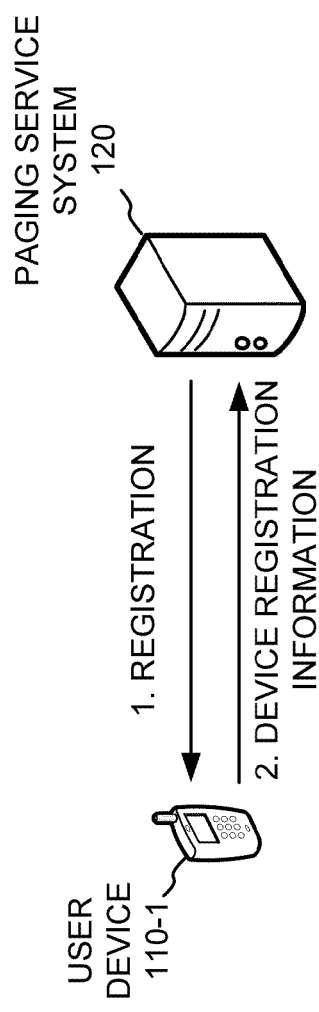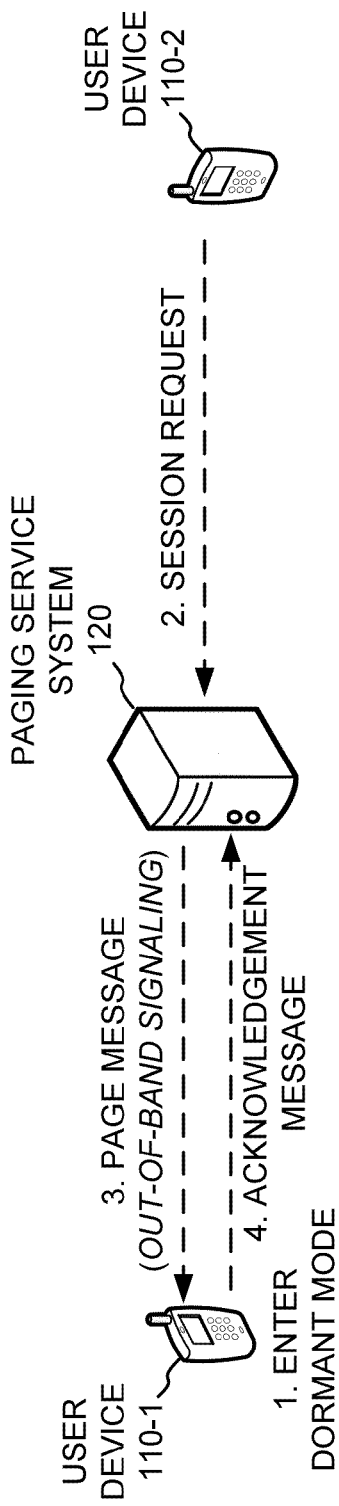

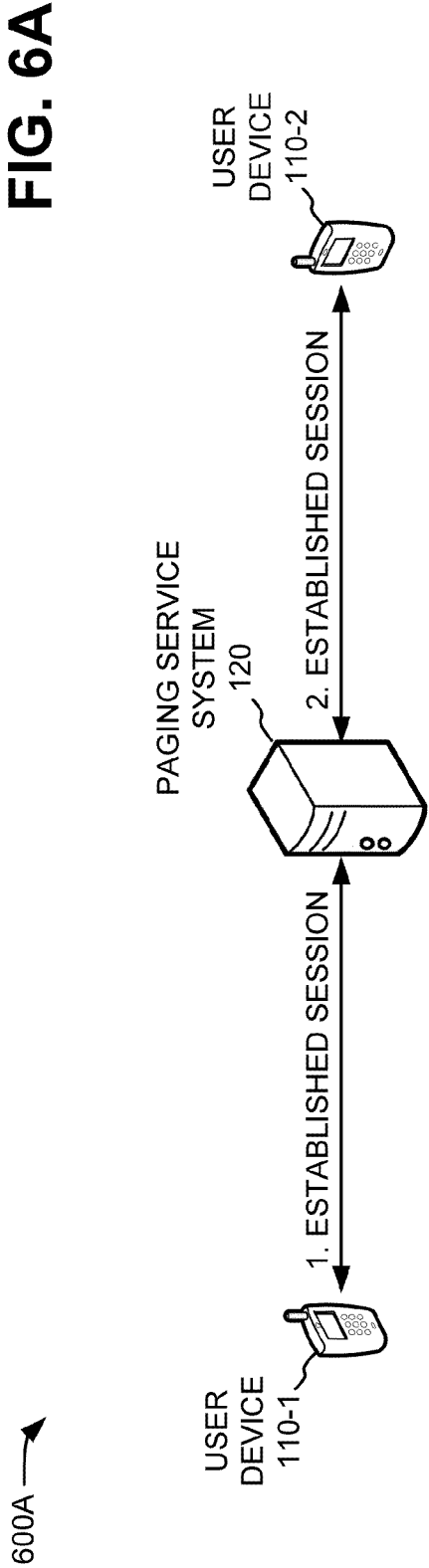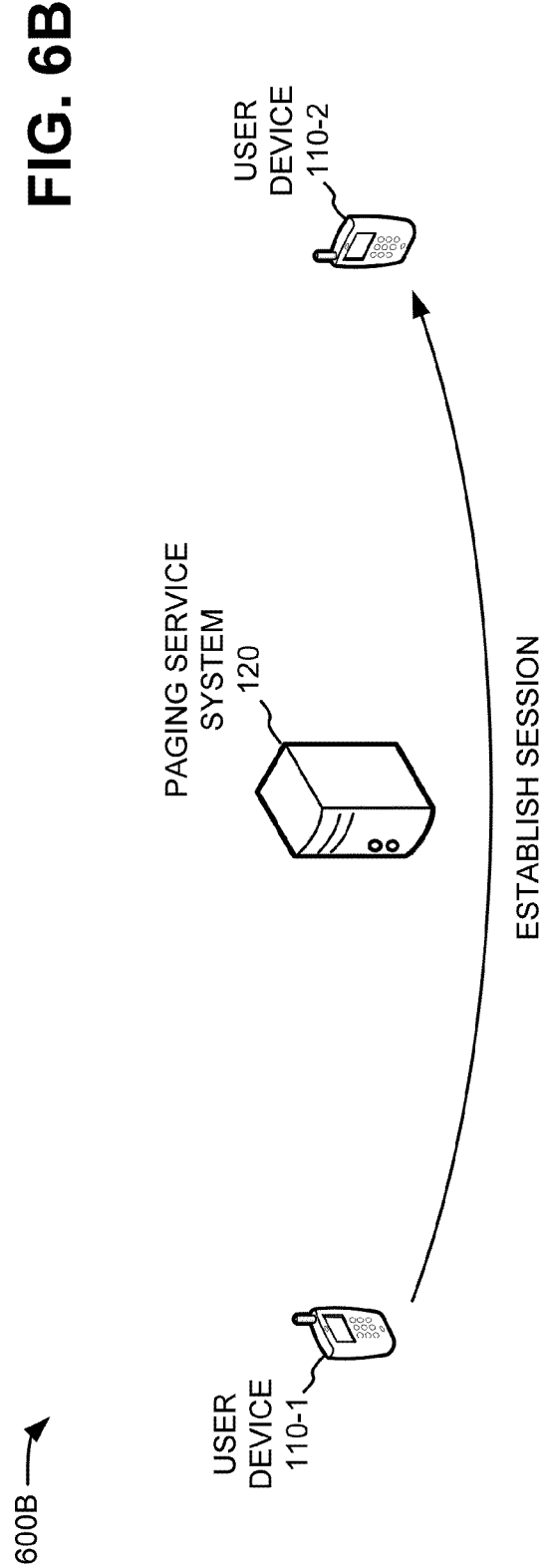

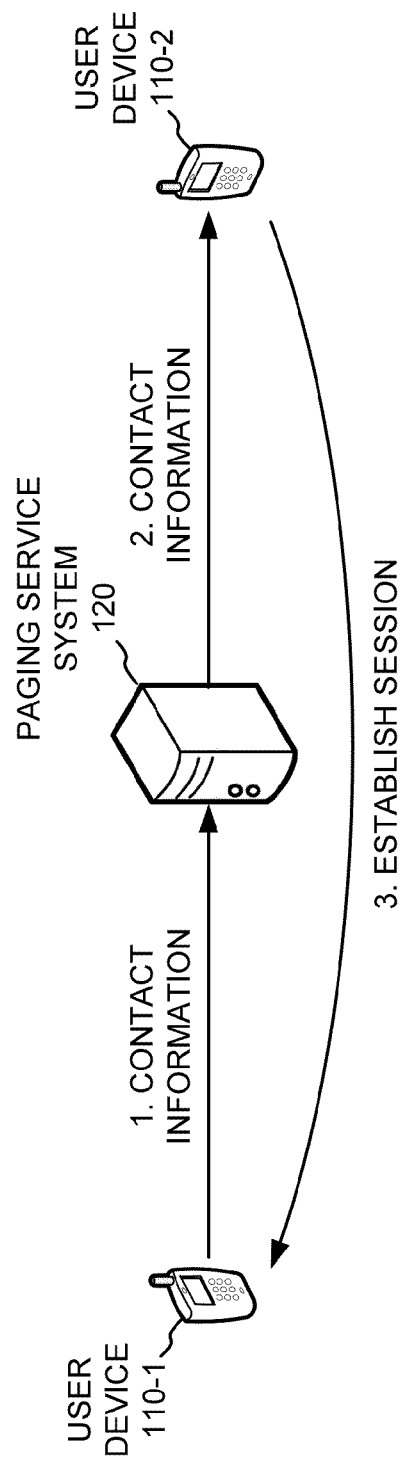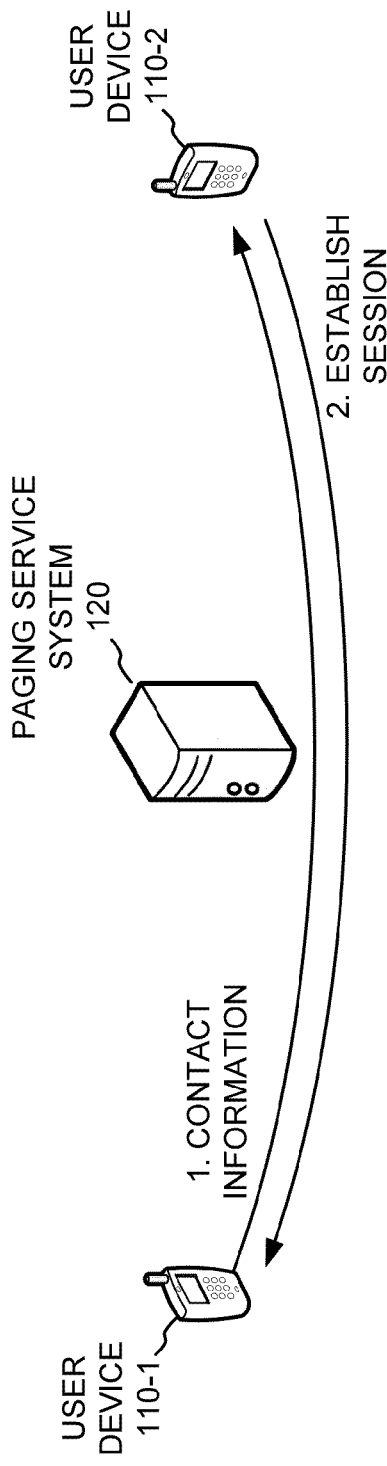

DELAYED NETWORK INTERFACE SELECTION

BACKGROUND

Available network technologies include a variety of different networks, such as local area networks (LANs), wide area networks (WANs), wireless networks, and satellite networks. Many of these networks operate by assigning identifiers, such as Internet Protocol (IP) addresses, to user devices, network devices, and other types of devices in the network. However, many networks include a variety of deficiencies, such as a limited number of identifiers (e.g., IP addresses).

SUMMARY

According to one aspect, a user device may include a memory to store instructions, and a processor, connected to the memory, to: communicate registration information to a paging service system, receive a page message from the paging service system via out-of-band signaling, where the page message includes a request to establish a communication session with a device and out-of-band signaling comprises a communication channel not dedicated for transmitting call data, select an in-band channel dedicated for transmitting call data, and establish a communication session with the device using the in-band channel.

According to another aspect, a method may include establishing, by a user device, a connection with a paging service system via an in-band channel; registering, by the user device, with the paging service system by providing registration information to the paging service system; terminating, by the user device, the connection with the paging service system upon entering a dormant mode; receiving, by the user device, a page message from the paging service via an out-of-band channel, the page message comprising a request to establish a communication session with a device; exiting, by the user device, the dormant mode in response to an input to establish a communication session; registering, by the user device, with a network via an in-band channel after exiting the dormant mode or operation; and establishing, by the user device, a communication session with the networked device using the in-band channel.

In yet another aspect, a non-transitory computer-readable medium may store a program for causing a device to perform a method. The method may include receiving registration information from a user device via an in-band channel, where the in-band channel comprises an Internet Protocol (IP) channel; receiving a session request corresponding to the user device from a device; accessing the registration information received from the user device in response to receiving the session request; and, in response to the session request, sending a page message to the user device via an out-of band channel based on the registration information.

BRIEF DESCRIPTION OF THE DRAWINGS

FIG. 5A is a diagram of an example process for registering a user device with a paging system according to one or more implementations described herein;

FIG. 5B is a diagram of an example process for paging a user device according to one or more implementations described herein;

FIGS. 6A-6D are diagrams of example processes for establishing a communication session according to one or more implementations described herein;

DETAILED DESCRIPTION

The following detailed description refers to the accompanying drawings. The same labels and/or reference numbers in different drawings may identify the same or similar elements.

In an implementation, described herein, devices may be used to better conserve network resources (e.g., IP addresses) by delaying network interface selection until it is clear that a communication session needs to be established. For example, a user device may register with a paging service system and enter into a dormant mode (also referred to herein as a "dormant mode of operation"). Entering into a dormant mode may include temporarily disabling in-band signaling capabilities. When another device wants to contact the dormant user device, the paging service system may send a page message to the dormant user device using an out-of-band channel. The dormant user device may respond to the page message by exiting the dormant mode, registering with an available communication network (e.g., a wireless IP network), and establishing a communication session with the other device.

Figure 1:
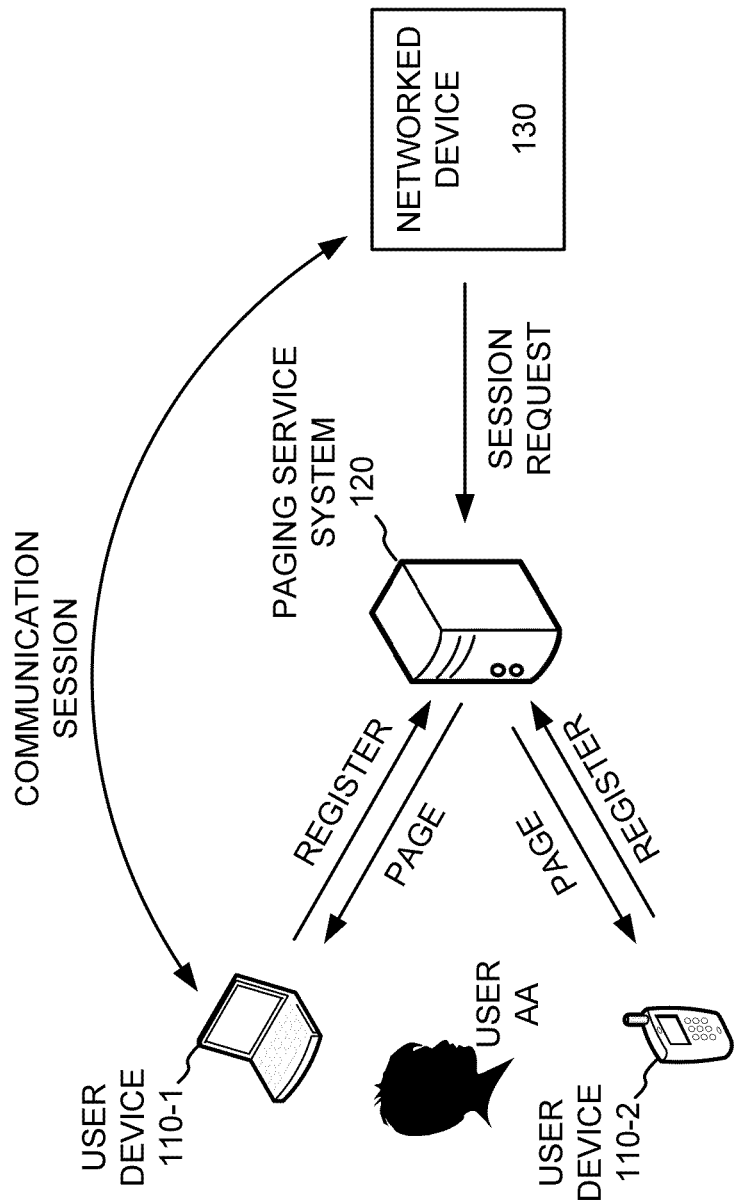
FIG. 1 is a diagram of an overview of an implementation described herein.

FIG. 1 is a diagram of an overview 100 of an implementation described herein. As depicted, overview 100 may include user AA, user device 110-1, user device 110-2, paging service system 120, and networked device 130. The systems and devices of FIG. 1 may correspond to one or more systems or devices described herein.

User devices 110 may each include one or more of a variety of computing devices, including a smart phone, a tablet computer, a laptop computer, a computer, or another type of computing device capable of operating in a networked environment. User devices 110 may each be capable of communicating over a variety of wired and/or wireless network interfaces. In the depicted example, assume that both user devices 110 belong to user AA.

Similarly, paging service system 120 may include one or more of a variety of devices. For instance, paging service system 120 may include a computer, a server, a cluster of servers, or another type of computing device capable of operating in a networked environment. In some implementations, paging service system 120 may be implemented in a single computing device, such as a network server, while in other implementations, paging service system 120 may be implemented using multiple devices in one or more locations. Paging service system 120 may be capable of communicating over a variety of wired and/or wireless network interfaces.

Networked device 130 may include one or more of a variety of computing devices. For example, networked device 130 may include a smart phone, a tablet computer, a laptop computer, a computer, or another type of computing device. Networked device 130 may also, or alternatively, include a server, a cluster of servers, or another type of networked device. For example, networked device 130 may include a web server, an application server, or a Voice over IP (VoIP) server. Similar to user devices 110 and paging service system 120, networked device 130 may be capable of communicating over a variety of wired and/or wireless network interfaces.

User AA may register user devices 110 with paging service system 120. Registering user devices 110 may include providing information regarding user devices 110 to the paging service system, so that paging service system 120 may send page messages to user devices 110. Registering user devices 110 may also, or alternatively, include submitting one or more user preferences regarding the manner in which page messages may be sent to user devices 110. In some implementations, user devices 110 may be registered as two independent devices. However, in other implementations, registering user devices 110 may include logically associating user devices 110 to one another and/or to a user profile or user identifier (ID) of user AA.

User devices 110 may enter into a dormant mode in response to, for example, a command from user AA or a prolonged state of idleness. Entering into a dormant mode may include disabling certain capabilities, such as one or more in-band signaling capabilities. Entering into a dormant mode may also, or alternatively, include maintaining (or enabling) other networking capabilities, such as out-of-band (e.g., wideband and/or narrowband) networking capabilities.

Networked device 130 may attempt to establish a communication session with user device 110 by sending a session request to paging service system 120. A session request may include a variety of information, including information identifying user AA, user device 110, and/or networked device 130. Session request may also, or alternatively, include information specifying a network application for establishing a communication session. Examples of such applications may include a VoIP application, a peer-to-peer (P2P) application, a social networking application, a background download service application, or another type of application relating to networking or communication. In some implementations, networked 130 device is a computer running an application seeking to converse with other networked device 110.

Paging service system 120 may respond to a session request by sending a page message to one or more of user devices 110, depending on the preference information submitted by user AA while registering user devices 110. Since user devices 110 are in dormant mode, as mentioned above, paging service system 120 may decide to send the page message using out-of-band signaling. Out-of-band signaling may include communicating information using a channel that is not dedicated for call transmissions. A page message may include a variety of information arranged according to one or more formats. For example, a page message may be a short message services (SMS) message notifying user devices 110 of the session request sent by networked device 130, or a narrowband conversational channel dedicated for delivering paging messages.

Each user device 110 may receive the page message and provide user AA with an option for establishing a communication session with networked device 130. In the depicted example, user AA decides to establish a communication session with networked device 130 and selects user device 110-1 to establish the communication session. User device 110-1 may exit from dormant mode, register with one or more available networks (e.g., a wireless IP network), and establish a communication session with networked device 130.

Figure 2:
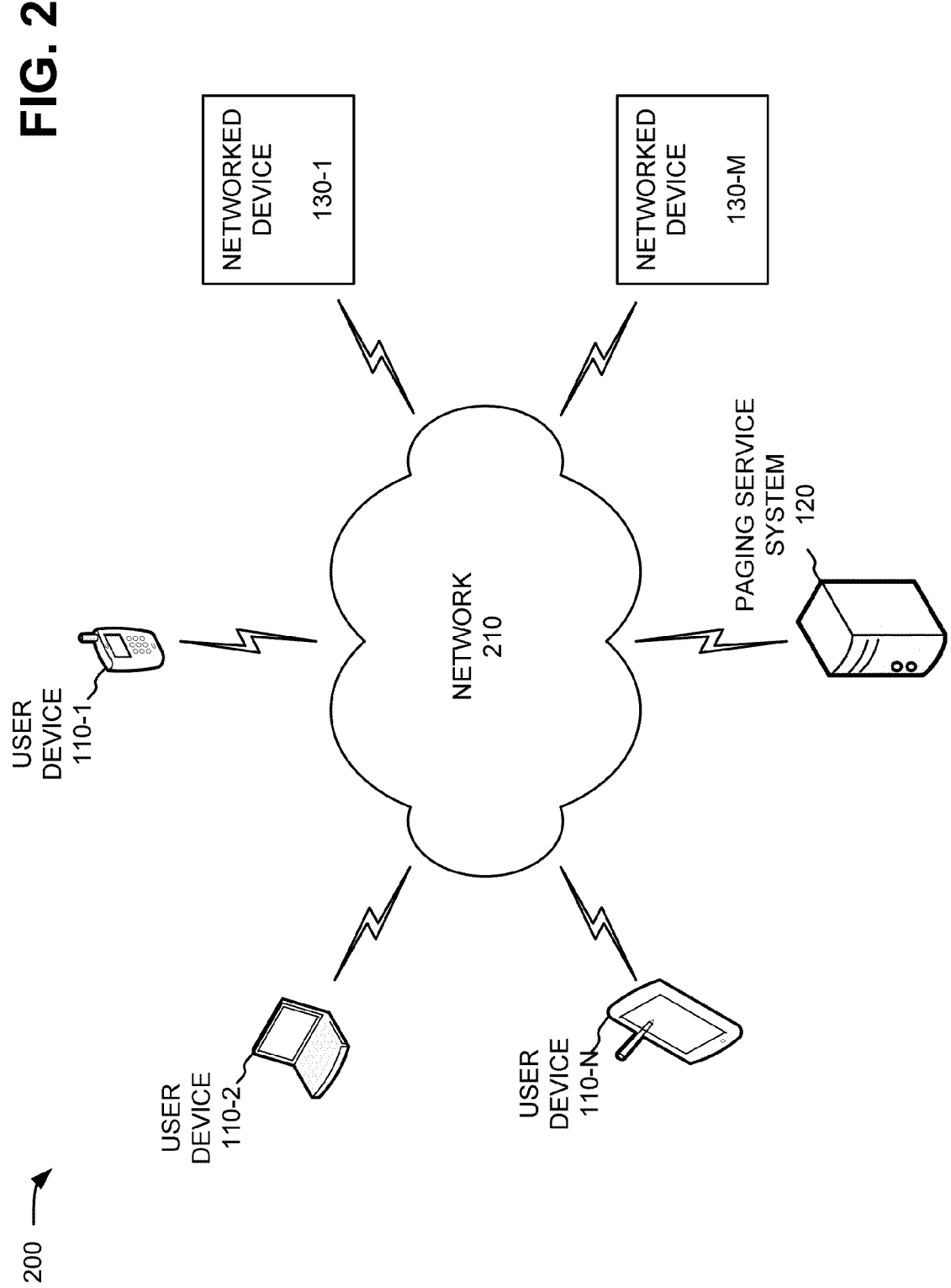
FIG. 2 is a diagram that illustrates an example environment in which systems and/or methods, described herein, may be implemented.

FIG. 2 is a diagram of an example environment 200 in which systems and/or methods, described herein, may be implemented. As depicted, environment 200 may include user devices 110-1, 110-2, . . . , 110-N (where N≥1) (collectively referred to as "user devices 110," and individually as "user device 110"), paging service system 120, networked devices 130-1, . . . , 130-M (where M≥1) (collectively referred to as "networked devices 130," and individually as "networked device 130"), and network 210. While FIG. 2 shows a particular number and arrangement of systems, networks, or devices, in alternative implementations, environment 200 may include additional systems, networks or devices, fewer systems, networks or devices, different systems, networks or devices, or differently arranged systems, networks or devices than those depicted. Similarly, environment 200 may include any number, variety, or combination of wired and/or wireless connections.

User devices 110, paging service system 120, and networked devices 130 were described above with reference to FIG. 1. User devices 110, paging service system 120, and networked devices 130 may be capable of communicating with one another via one or more connections with network 210. In some implementations, one or more of user devices 110, paging service system 120, or networked devices 130 may be part of, integrated with, or managed by one or more networks or devices of network 210. In some scenarios, environment 200 may not include any user devices 110 (e.g., N=0. In such scenarios, paging service system 120 may indicate to networked device 130 that a user and/or user device 110 is unavailable.

Network 210 may include any type of network or combination of networks. For example, network 210 may include a LAN (e.g., an Ethernet network), a wireless LAN (WLAN) (e.g., an IEEE 802.11 network), a wide area network (WAN) (e.g., the Internet), a wireless WAN (WWAN) (e.g., a 3gpp System Architecture Evolution (SAE) Long-Term Evolution (LTE) network, a Global System for Mobile Communications (GSM) network, a Universal Mobile Telecommunications System (UMTS) network, a Code Division Multiple Access 2000 (CDMA2000) network, a High-Speed Packet Access (HSPA) network, a Worldwide Interoperability for Microwave Access (WiMAX) network, etc.). Additionally, or alternatively, network 210 may include a fiber optic network, a metropolitan area network (MAN), an ad hoc network, a virtual network (e.g., a virtual private network (VPN)), a telephone network (e.g., a Public Switched Telephone Network (PSTN)), a cellular network, a VoIP network, or another type of network.

Figure 3:
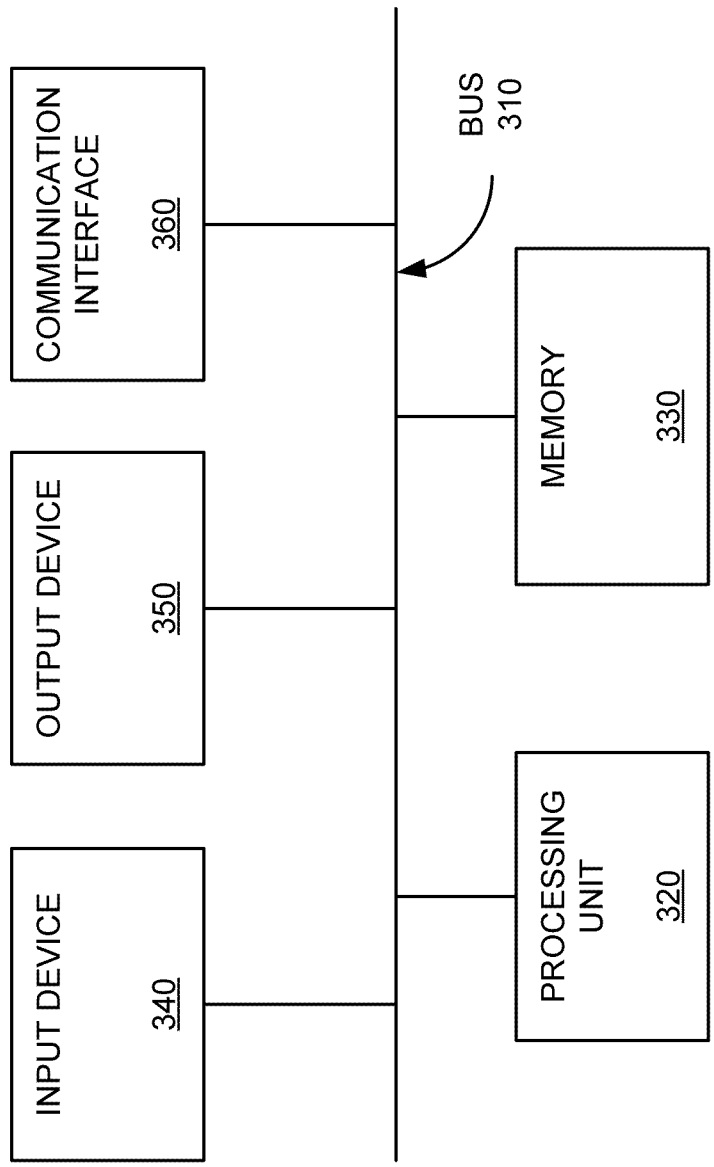
FIG. 3 is a diagram of example components of a device that may be used within the environment of FIG. 2.

FIG. 3 is a diagram of example components of a device 300 that may be used within environment 200 of FIG. 2. Device 300 may correspond to user device 110, paging service system 120, and/or networked device 130. Each of user device 110, paging service system 120, and networked device may include one or more devices 300 or one or more components of device 300. As depicted, device 300 may include bus 310, processing unit 320, memory 330, input device 340, output device 350, and communication interface 360. However, in other implementations, device 300 may include fewer components, additional components, different components, or differently arranged components than those illustrated in FIG. 3. In some implementations, device 300 may be a computer.

Bus 310 may include one or more paths that permit communication among the components of device 300. Processing unit 320 may include one or more processors, microprocessors, data processors, co-processors, network processors, application-specific integrated circuits (ASICs), controllers, programmable logic devices (PLDs), chipsets, field-programmable gate arrays (FPGAs), or other types of components that may interpret or execute instructions or data. Processing unit 320 may control the overall operation, or a portion thereof, of device 300, based on, for example, a set of instructions, an operating system, and/or various applications. Processing unit 320 may access instructions from memory 330, from other components of device 300, or from a source external to device 300 (e.g., a network or another device).

Memory 330 may include memory and/or secondary storage. For example, memory 330 may include random access memory (RAM), dynamic RAM (DRAM), read-only memory (ROM), programmable ROM (PROM), flash memory, or some other type of memory. Memory 330 may include a hard disk (e.g., a magnetic disk, an optical disk, a magneto-optic disk, a solid state disk, etc.) or some other type of computer-readable medium, along with a corresponding drive. A computer-readable medium may be defined as a non-transitory memory device. A memory device may include space within a single physical memory device or spread across multiple physical memory devices.

Input device 340 may include one or more components that permit a user to input information into device 300. For example, input device 340 may include a keypad, a button, a switch, a knob, fingerprint recognition logic, retinal scan logic, a camera, voice recognition logic, a touchpad, an input port, a microphone, a display, or some other type of input component. Output device 350 may include one or more components that permit device 300 to output information to a user. For example, output device 350 may include a display, light-emitting diodes (LEDs), an output port, a speaker, or some other type of output component.

Communication interface 360 may include one or more components that permit device 300 to communicate with other devices (e.g., user devices 110, paging service system 120, networked device 130, etc.) or networks (e.g., network 210). For example, communication interface 360 may include some type of wireless or wired interface. Communication interface 330 may also include an antenna (or a set of antennas) that permit wireless communication, such as the transmission and reception of radio frequency (RF) signals.

Figure 4:
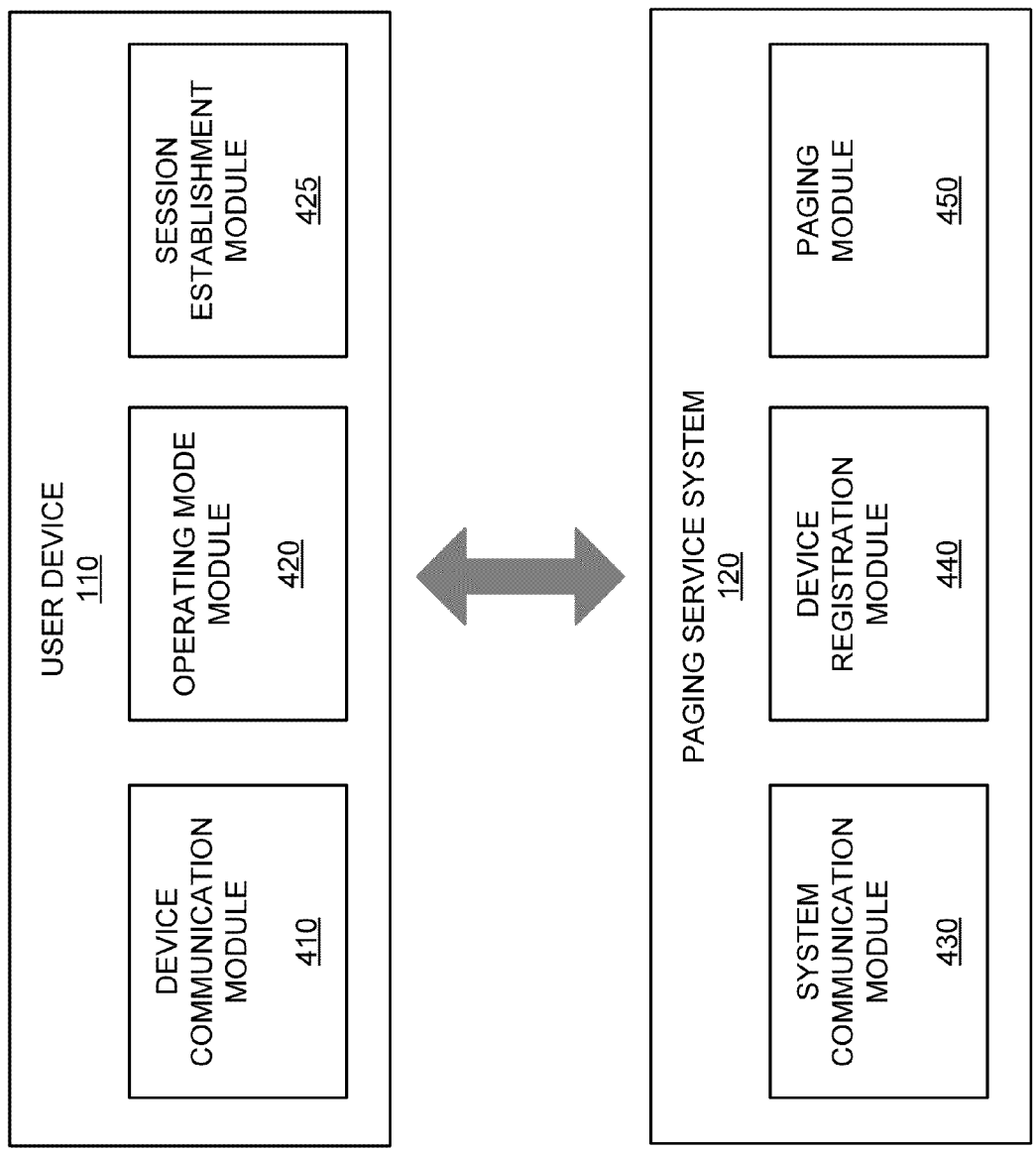
FIG. 4 is a diagram of example functional components of a user device of FIG. 2 and example functional components of a paging service system of FIG. 2.

As described herein, device 300 may perform certain operations in response to processing unit 320 executing software instructions contained in a computer-readable medium, such as memory 330. The software instructions may be read into memory 330 from another computer-readable medium or from another device via communication interface 360. The software instructions contained in memory 330 may cause processing unit 320 to perform one or more processes described herein. Alternatively, hardwired circuitry may be used in place of, or in combination with, software instructions to implement processes described herein. Thus, implementations described herein are not limited to any specific combination of hardware circuitry and software FIG. 4 is a diagram of example functional components of user device 110 and example functional components of paging service system 120. As depicted, user device 110 may include device communication module 410, operating module 420, and session establishment module 425, while paging service system 120 may include system communication module 430, device registration module 440, and paging module 450. In some implementations, one or more of modules 450 may correspond to one or more computers. Depending on the implementation, one or more of modules 410-425 and/or modules 430-450 may be implemented as a combination of hardware and software based on the components illustrated and described with respect to FIG. 3. Alternatively, modules 410-425 and/or modules 430-450 may each be implemented as hardware based on the components illustrated and described with respect to FIG. 3.

While FIG. 4 shows a particular number and arrangement of modules, in alternative implementations, user device 110 and/or paging service system 120 may include additional modules, fewer modules, different modules, or differently arranged modules than those depicted. FIG. 4 is further described below with corresponding references to FIGS. 5A-6D.

Device communication module 410 may provide functionality with respect to network communications. For example, device communication module 410 may enable user device 110 to communicate with any variety or combination of wired and/or wireless networks. Additionally, in some implementations, user device 110 may be capable of communicating with a device via multiple network interfaces (e.g., via an in-band channel and an out-of-band channel).

Operating mode module 420 may provide functionality with respect to modes of operation of user device 110. For example, operating mode module 420 may enable user device 110 to transition between an active mode and a dormant mode. An active mode may correspond to a mode of operation where user device 110 is fully functional with respect to establishing network connections and communicating via one or more channels (e.g., in-band channels). By contrast, as mentioned above, a dormant mode may include temporarily disabling certain networking capabilities, such as an ability to send and receive information via communications channels dedicated for call session transmissions. However, in some implementations, a dormant user device 110 may still be able to send and receive message or other information (e.g., SMS messages) via out-of-banding signaling.

Session establishment module 425 may provide functionality with respect to establishing communication sessions. For example, session establishment module 425 may enable user device 110 to establish a communication with another user device 110 in response to a page message from paging service system 120. Session establishment module 425 may enable user device 110 to establish a communication session in one or more of a variety of ways depending on the implementation.

System communication module 430 may provide functionality with respect to network communications. For instance, system communication module 430 may enable paging service system 120 to communicate with any variety or combination of wired and/or wireless networks. Examples of such networks are described above with reference to network 210 of FIG. 2.

Device registration module 440 may provide functionality with respect to registering user devices 110. For example, device registration module 440 may enable paging service system 120 to receive registration information from user devices 110 and store the registration information for later use. Device registration module 440 may also, or alternatively, enable paging service system 120 to store the registration information, update the registration information, perform queries on the registration information, and/or generate page messages based on the registration information.

FIG. 5A is a diagram of a process 500A for registering user device 110 according to one or more implementations described herein. As depicted, paging service system 120 may provide a registration interface to user device 110. The registration interface may enable user device 110 to create a user profile, a device profile, and/or submit other information to enable paging service system 120 to send a page message to user device 110. For example, the information may identify a user (e.g., a username, an e-mail address, etc.) of user device 110, associate the user with one or more user devices 110, submit contact information for each of the user devices 110 (e.g., a telephone number, an IP address, a simple message service (SMS) number, etc.), specify one or more user preferences (e.g., an order of user devices to page, a schedule for paging certain user devices, etc.), and/or submit other types of information related to enabling paging service system 120 to send an address message to user device 110. The registration interface may also, or alternatively, enable user device 110 to update the registration information if or when the registration information is no longer current.

Returning to FIG. 4, paging module 450 may provide functionality with respect to sending page messages to user device 110. For example, page module 450 may enable paging service system 120 to send a page message to a user device 110 in response to receiving a session request from networked device 130 or another user device 110. A page message may be sent using out-of-band signaling, which, as mentioned above, may include using a communication channel that is not dedicated for a particular type of signaling (e.g., call session transmissions).

FIG. 5B is a diagram of a process 500B for sending a page message to user device 110 according to one or more implementations described herein. As depicted, user device 110 may become dormant (e.g., enter a dormant mode). In some implementations, user device 110 may become dormant for one or more or a variety of reasons. For example, user device 110 may become dormant in response to a command from a user, a command from a networked device 130, an inactivity timer expiring, or another type of event relating to user device 110.

Networked device 130 may send a session request to paging service system 120. As mentioned above, a session request may be a request for one device (e.g., networked device 130, another user device 110, etc.) to establish a communication session with user device 110. A session request may include a variety of information, including information identifying user device 110 or networked device 130, information associated with user device 110 or networked device 130, and/or other types of information relating to establishing a communication session between user device 110 and networked device 130.

Paging service system 120 may determine an appropriate method to send a page message to user device 110. For example, based on the registration information received from user device 110, paging service system 110 may identify an appropriate network (e.g., a cellular network, the Internet, etc.) and corresponding parameters (e.g., a telephone number, an IP address, a SMS number, etc.) for sending a page message to user device 110. In some implementations, paging service system 120 may send a page message in the form of an out-of-band SMS message.

In some implementations, user device 110 may receive a page message, analyze the page message, send a corresponding acknowledgement message to paging service system 120, and/or determine whether to establish a communication session with networked device 130. In certain implementations, user device 110 may do so while remaining in a dormant mode of operation. In other implementations, user device 110 may do so while in an active mode of operation and then, at some point, transition to a dormant mode of operation. If user device 110 does not decide to establish a communication session with networked device 130, user device 110 may ignore the page message (e.g., the user is currently occupied with other activities, does not wish to communicate with the calling device or caller, etc.). However, if user device 110 decides to establish a communication session with networked device 130, user device 110 may do so in one or more of a variety of ways, each of which may include exiting the dormant mode and registering with an available network (e.g., a WLAN, a wide wireless area network (WWAN), etc.).

FIGS. 6A-6D are diagrams of example processes 600 (individually referenced as 600A, 600B, 600C, and 600D) for establishing a communication session according to one or more implementations described herein. Referring to FIG. 6A, device communication module 410 may enable user device 110 to establish a communication session with networked device 130 via paging service system 120. In some implementations, this may include system communication module 430 of paging service system 120 establishing one communication session with user device 110 and a corresponding communication session with networked device 130, as depicted.

Referring to FIG. 6B, device communication module 410 may also, or alternatively, enable user device 110 to establish a connection with networked device 130 without involving paging service system 120. In some implementations, the communication session may be established based on information, in the page message, regarding networked device 130. In some implementations, the information in the page message may have originated from a session request message sent by networked device 130 to paging services system 120.

Referring to FIGS. 6C-6D, device communication module 410 may also, or alternatively, enable user device 110 to establish a communication session with networked device 130 by creating or operating as a network endpoint for the communication session. In such implementations, user device 110 may select a network interface for the communication session with networked device 130, create a network endpoint corresponding to the selected network interface, and communicate contact information (e.g., an IP address, a media access control (MAC) address, etc.) to networked device 130 via paging service system 120, as depicted in FIG. 6C, or directly to networked device 130, as depicted in FIG. 6D. In response, networked device 130 may contact user device 110 directly as depicted in FIGS. 6C-6D.

Figure 7:
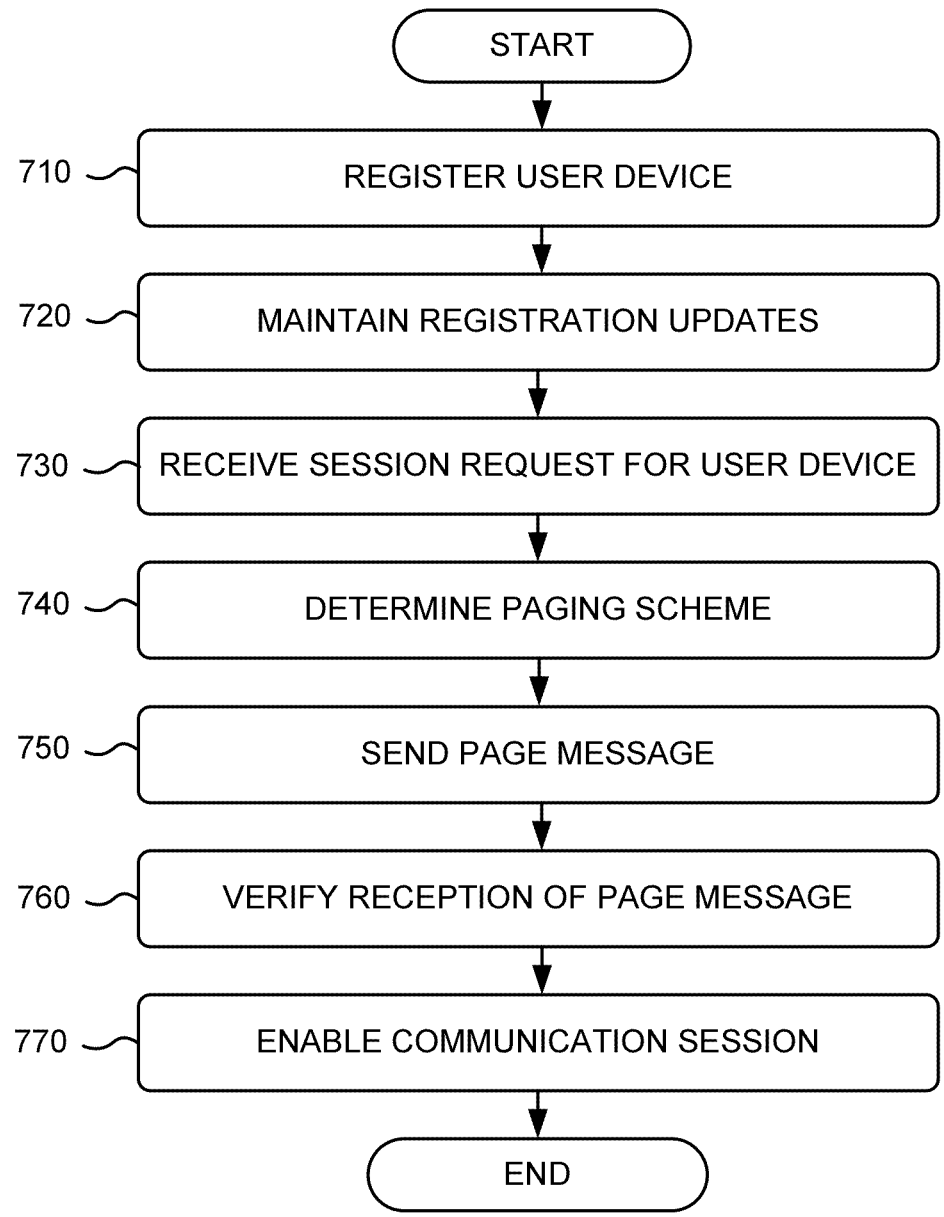
FIG. 7 is a diagram of an example process for enabling a communication session according to one or more implementations described herein.

FIG. 7 is a diagram of a process 700 for enabling a communication session according to one or more implementations described herein. In some implementations, process 700 may be performed by one or more components of paging service system 120. In some implementations, one or more blocks of process 700 may be performed by one or more other components, or a group of components, including or excluding the components of paging service system 120. FIG. 7 is described below with corresponding references to FIG. 8.

Process 700 may include registering user device 110 (block 710). For example, paging service system 120 may provide a user interface to user device 110 for submitting registration information. As mentioned above, registration information may include a variety of information, including a user identifier, a device identifier, a network interface identifier, and/or other information for sending a page message to a user device 110. Similarly, user device 110 may send updated registration information to paging service system 120, and paging service system 120 may update the corresponding registration information (block 720).

A request for a communication session with a registered user device may be received (block 730). For example, paging service system 120 may receive a request for a communication session with a user device 110 that is registered with paging service system 120. In some implementations, the session request may originate from another user device 110 or from a VoIP server, a web server, or another type of networked device 130. In some implementations, a paging service may include a distributed hash table. For instance, in implementations, where paging service system 120 includes a distributed paging service, the paging service may be implemented by way of a distributed hash table.

A paging scheme may be determined (block 740). For instance, paging service system 120 may identify a way of sending a page message to user device 110. In some implementations, paging service system 120 may do so by accessing registration information corresponding to user device 110.

Figure 8:
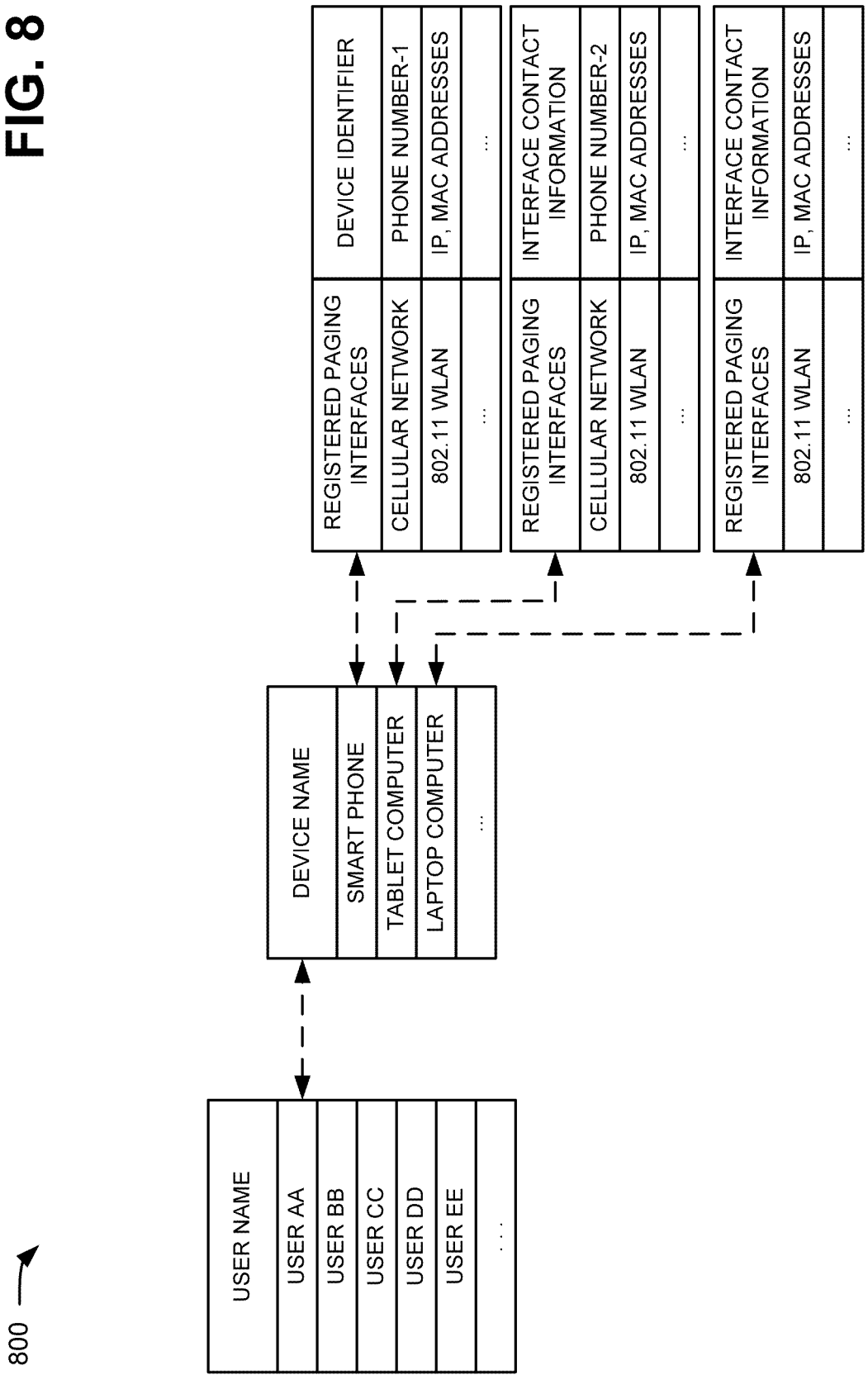
FIG. 8 is a diagram of example data structures of registration information according to one or more implementations described herein.

FIG. 8 is a diagram of example data structures 800 of registration information according to one or more implementations described herein. As depicted, multiple users may be registered with paging service system 120, and each user may register one or more user devices. As represented by data structures 800, USER AA has registered a smart phone, a tablet computer, and a laptop computer. Data structures also indicate that, for example, a page message may be sent to the smart phone of USER AA via a cellular network interface at the provided telephone number. A page message may also, or alternatively, be sent to the smart phone via an IEEE 802.11 WLAN using, for example, the provided IP address and MAC address.

One or more of data structures 800 may include priority or preference information submitted by a user during or after registration. For example, USER AA may have specified a preference to receive page messages via a registered smart phone. Similarly, USER AA may have indicated a preference to receive a page message via a cellular network. In the latter scenario, if paging service system 120 were to receive a session request corresponding to USER AA, paging service system 120 may respond by sending a page message (e.g., an SMS message) to the smart phone of USER AA over a cellular network. In some implementations, if paging service system 120 does not receive an acknowledgement message or other form of confirmation from the smart phone, paging service system 120 may attempt to page the smart phone over the registered IEEE 802.11 WAN interface or perhaps attempt to page the tablet computer or the laptop computer that are also registered to user AA.

Returning to FIG. 7, a registered device may be paged (block 750). For example, paging service system 120 may send a page message to user device 110. In some implementations, paging service system 120 may send a page message based on registration information that paging service system 120 received previously. As mentioned above, a page message may include a variety of data structures communicated via out-of-band signaling. In some implementations, a page message may be an SMS message notifying user device 110 of a request to establish a communication session.

Delivery of the page message may be verified (block 760). For example, paging service system 120 may monitor for a confirmation message from user device 110. In some implementations, paging service system 120 may monitor for the confirmation message for a preselected time interval. In certain implementations, if an acknowledgement message is not received before the expiration of a preselected time interval, paging service system 120 may resend the page message using the same network interface and parameters as before (see, for example, block 750) or resend the page message using a different network interface and/or parameters than before.

A communication session with a registered device may be enabled (block 770). For example, in some implementations, paging service system 120 may enable, facilitate, or otherwise participate in, the establishment of a communication session between a registered user device 110 and networked device 130. In some implementations, paging service system 120 may operate as an intermediary for the communication session between user device 110 and networked device 130 (see, for example, FIG. 6A), and in other implementations, paging service system 120 may relay contact information between user device 110 and networked device 130 to facilitate the establishment of a communication session (see, for example, FIG. 6C).

While FIG. 7 shows a flowchart diagram of an example process 700 for enabling a communication session, in other implementations, a process for enabling a communication session may include fewer operations, different operations, differently arranged operations, or additional operations than depicted in FIG. 7.

Figure 9:
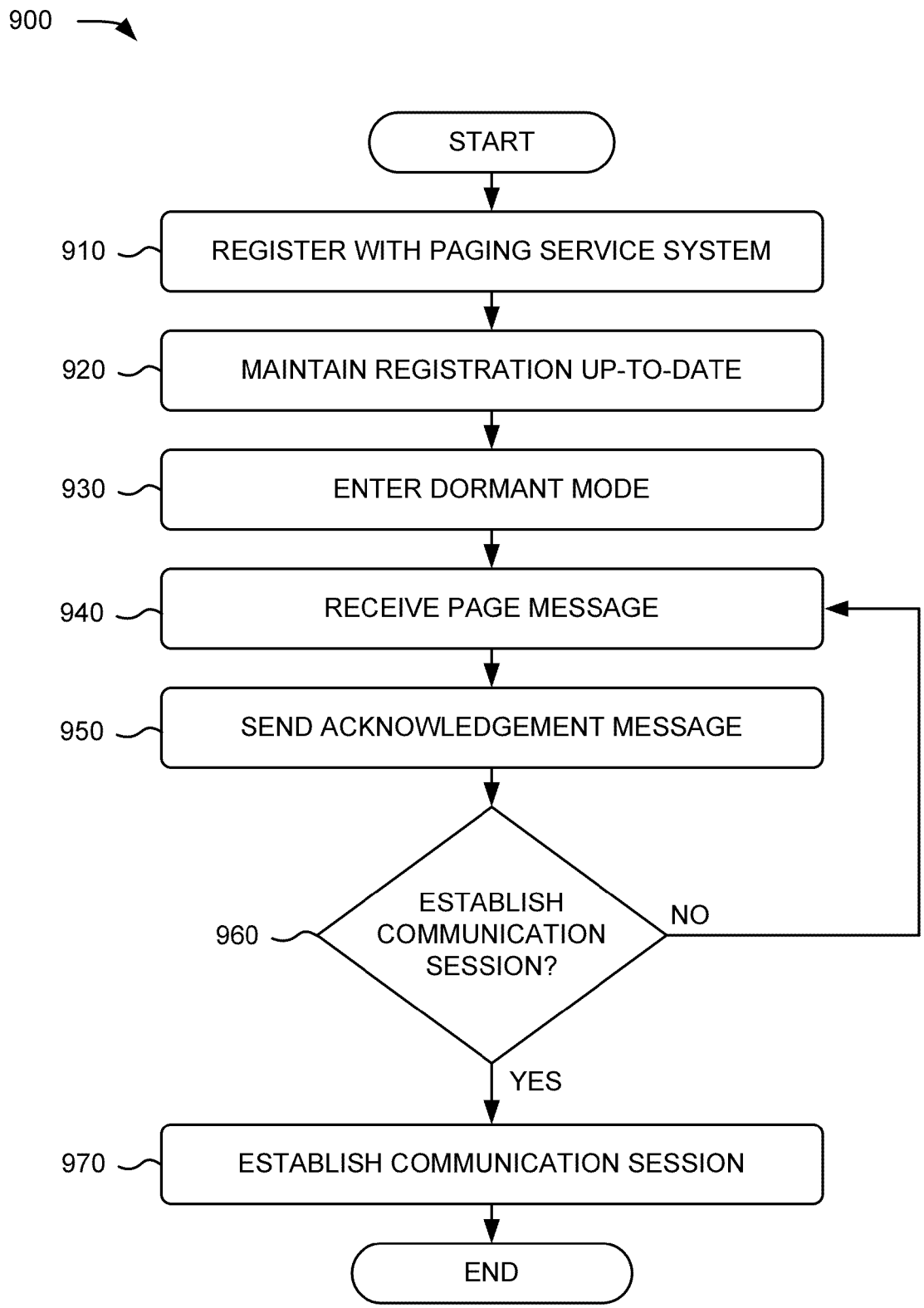
FIG. 9 is a diagram of another example process for enabling a communication session according to one or more implementations described herein.

FIG. 9 is a diagram of another process 900 for enabling a communication session according to one or more implementations described herein. Process 900 may be performed by user device 110. In some implementations, process 900 may be performed by one or more components of user device 110. In some implementations, one or more blocks of process 900 may be performed by one or more other components, or a group of components, including or excluding the components of user device 110.

Process 900 may include registering with paging service system 120 (block 910). For example, user device 110 may provide registration information to paging service system 120, so that paging service system 120 may be capable of sending a page message to user device 110. User device 110 may also, or alternatively, provide updated registration information if previously submitted registration information is no longer current (block 920), A dormant mode may be entered into (block 930). For example, user device 110 may enter into a dormant mode for various reasons, such as a user command or a prolonged period of inactivity. As discussed above, entering into a dormant mode may include disabling some networking capabilities of user device 110 (e.g., in-band signaling capabilities) and maintaining other networking capabilities enabled (e.g., out-of band signaling capabilities).

A page message may be received (block 940). For instance, user device 110 may receive a page message from paging service system 120. A page message may include a data structure informing user device 110 of a request for a communication session from another device (e.g., another user device 110). User device 110 may also, or alternatively, send an acknowledgement message to paging service system 120 in response to the page message (block 950).

A determination may be made whether to establish a communication session (block 960). For example, user device 110 may determine whether to establish a communication session in response to receiving a page message from paging service system 120. Whether user device 110 decides to establish a communication session may depend on a variety of factors, such as information contained in the page message and/or one or more policies or rules of user device 110 for establishing communication sessions. For instance, user device 110 may decline the page message if the corresponding session request originated from a blocked or otherwise prohibited networked device 130.

In some implementations, if a communication session will not be established (block 960—No), user device 110 may continue listening for another page message while remaining dormant (block 940). However, if a communication session will be established (block 960—Yes), user device 110 may establish a communication session with the device (e.g., networked device 130, another user device 110, etc.) identified or otherwise associated with the page message (block 970).

Establishing a communication session may include waking up or otherwise exiting from a dormant mode and registering with an available network, which may include being assigned network resources, such as an IP address. In some implementations, user device 110 may select a network interface for establishing the communication session. For example, user device 110 may select an IEEE 802.11 WLAN interface, a GPRS interface, or another network interface. In certain implementations, user device 110 may also, or alternatively, select an application for establishing the communication session. For example, user device 110 may decide between a VoIP application, a peer-to-peer (P2P) application, a social networking application, or another type of software application capable of enabling two or more devices to communicate over one or more networks. In some implementations, the page message, received from paging service system 120, may identify a network type (e.g., IEEE 802.11 network, the Internet, etc.) and/or application suggested for establishing the communication session. The resulting communication session may be established in a variety of ways, such as via direct communications between user devices 110 and/or via communications between user devices 110 and paging service system 120 (see, for example, FIGS. 6A-6D).

While FIG. 9 shows a flowchart diagram of an example process 900 for enabling a communication session, in other implementations, a process for enabling a communication session may include fewer operations, different operations, differently arranged operations, or additional operations than depicted in FIG. 9.

Accordingly, in one or more implementations, described herein, devices may be used to conserve network resources (e.g., IP addresses) by delaying network interface selection. For example, user device 110 may register with paging service system 120 and enter into a dormant mode. Another device may attempt to contact dormant user device 110 by sending a session request to paging service system 120, which may respond by notifying dormant user device 110 of the other device by sending a page message to dormant user device 110 using out-of-band signaling. The dormant user device 110 may respond to the page message by exiting the dormant mode, registering with an available communication network (e.g., a wireless IP network), and establishing a communication session with the other device.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain implementations may involve a component that performs one or more functions. These components may include hardware, such as an ASIC or a FPGA, or a combination of hardware and software.

Even though particular combinations of features are recited in the claims and/or disclosed in the specification, these combinations are not intended to limit disclosure of the possible implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

No element, act, or instruction used in the present application should be construed as critical or essential to the disclosed implementations unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A user device comprising:
a memory to store instructions; and
a processor, connected to the memory, to:
provide registration information to a paging service system via in-band signaling;
enter a dormant mode after providing the registration information to the paging service system;
disable, based on entering the dormant mode, in-band signaling capabilities of the user device;
receive, while the user device is in the dormant mode, a page message from the paging service system via out-of-band signaling,
the page message including a request to establish a communication session with a device, and
the out-of-band signaling including a communication channel not dedicated for call session transmissions;
determine not to establish the communication session based on information corresponding to the page message; and
ignore the page message, while remaining in the dormant mode, based on determining not to establish the communication session.

2. The user device of claim 1, where, when providing the registration information to the paging service system, the processor is further to:
provide data, to the paging service system, that enables the paging service system to:
send the page message to the user device,
identify a user associated with the user device,
identify other user devices associated with the user, and
send other page messages to the other user devices based on user preference information associated with the user device and the other user devices.

3. The user device of claim 1, where the in-band signaling includes communicating using an Internet Protocol (IP) network interface.

4. The user device of claim 1, where the processor is to:
receive another page message;
determine to establish another communication session based on the other page message;
select an in-band channel to establish the other communication session after determining to establish the other communication session; and
establish the other communication session by using the in-band channel.

5. The user device of claim 1, where the processor is to:
send an acknowledgement message to the paging service system based on receiving the page message.

6. The user device of claim 1, where the processor is to:
receive another page message; and
establish, based on the other page message, another communication session via the paging service system.

7. The user device of claim 1, where the processor is to:
receive another page message;

determine to establish another communication session based on the other page message;
create an endpoint for the device to communicate with after determining to establish the other communication session, and
communicate information describing the endpoint to the device directly or through the paging service system.

8. The user device of claim 1, where the processor is to:
receive another page message,
the other page message including another request to establish another communication session with the device; and
select an application for establishing the other communication session with the device,
the application being one of a Voice over Internet Protocol (VoIP) application, a peer-to-peer (P2P) application, or a social networking application.

9. The user device of claim 1, where the request to establish the communication session corresponds to a session request message received by the paging service system from the device.

10. The user device of claim 1,
where the page message is a simple message service (SMS) message, and
where the page message further includes contact information corresponding to the device.

11. A method comprising:
establishing, by a user device, a connection with a paging service system via an in-band channel;
entering, by the user device, a dormant mode of operation;
terminating, by the user device, the connection with the paging service system upon entering the dormant mode of operation;
disabling, by the user device, in-band signaling capabilities of the user device upon entering the dormant mode of operation;
receiving, by the user device, a page message;
determining, by the user device, not to establish a communication session based on information corresponding to the page message; and
ignoring, by the user device, the page message while remaining in the dormant mode when a determination is made not to establish the communication session;
receiving, by the user device, another page message from the paging service system via an out-of-band channel, the other page message comprising a request to establish another communication session with a device,
exiting, by the user device, the dormant mode of operation based on receiving the other page message;
establishing, by the user device, the other communication session with the device by using the in-band channel.

12. The method of claim 11, further comprising:
registering, before terminating the connection, with the paging service system by providing registration information to the paging service system,
the registration information associating a user identity with a device identity of the user device and associating the device identity with contact information corresponding to the out-of-band channel used to receive the other page message.

13. The method of claim 11, further comprising:
receiving an additional page message;
determining to establish an additional communication session based on the additional page message;
selecting an in-band channel to establish the additional communication session after determining to establish the additional communication session; and
establishing the additional communication session by using the in-band channel.

14. The method of claim 11, further comprising:
receiving an additional page message;
determining to establish an additional communication session based on the additional page message;
creating an endpoint for the device to communicate with after determining to establish the additional communication session, and
communicating information describing the endpoint to the device directly or through the paging service system.

15. The method of claim 11, further comprising:
providing registration information to the paging service system,
providing the registration information to the paging service including:
providing data, to the paging service system, that enables the paging service system to:
send the other page message to the user device,
identify a user associated with the user device,
identify other user devices associated with the user, and
send other page messages to the other user devices based on user preference information associated with the user device and the other user devices.

16. A non-transitory computer-readable medium storing instructions, the instructions comprising:
one or more instructions that, when executed by at least one processor of a user device, cause the at least one processor to:
provide registration information to a paging service system via in-band signaling;
enter a dormant mode after providing the registration information to the paging service system;
disable, based on entering the dormant mode, in-band signaling capabilities of the user device;
receive, while the user device is in the dormant mode, a page message from the paging service system via out-of-band signaling,
the page message including a request to establish a communication session with a device, and
the out-of-band signaling including a communication channel not dedicated for call session transmissions;
determine not to establish the communication session based on information corresponding to the page message; and
ignore the page message, while remaining in the dormant mode, based on determining not to establish the communication session.

17. The non-transitory computer-readable medium of claim 16, where the one or more instructions to provide the registration information to the paging service system further comprise:
one or more instructions to provide data, to the paging service system, that enables the paging service system to:
send the page message to the user device,
identify a user associated with the user device,
identify other user devices associated with the user, and
send other page messages to the other user devices based on user preference information associated with the user device and the other user devices.

18. The non-transitory computer-readable medium of claim 16, where the instructions further comprise:
one or more instructions to receive another page message;

one or more instructions to determine to establish another communication session based on the other page message;

one or more instructions to select an in-band channel to establish the other communication session after determining to establish the other communication session; and one or more instructions to establish the other communication session by using the in-band channel.

19. The non-transitory computer-readable medium of claim 16, where the instructions further comprise:

one or more instructions to receive another page message; and one or more instructions to establish, based on the other page message, another communication session via the paging service system.

20. The non-transitory computer-readable medium of claim 16, where the instructions further comprise:

one or more instructions to receive another page message;

one or more instructions to determine to establish another communication session based on the other page message;

one or more instructions to create an endpoint for the device to communicate with after determining to establish the other communication session, and one or more instructions to communicate information describing the endpoint to the device directly or through the paging service system.

\* \* \* \* \*